Feb. 26, 1946. W. KELLGREN ET AL 2,395,668

LINER FOR ADHERENT RUBBBER SURFACES AND THE LIKE

Filed Nov. 3, 1941

Fig. 1

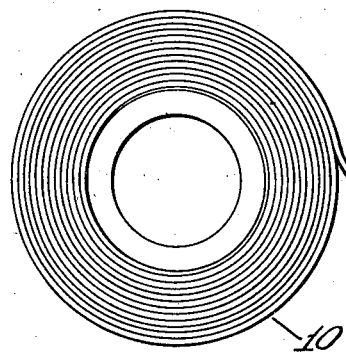

Removable liner of creped paper coated on both sides with composition of low adherency to adhesive.

—12
—11

Adhesive tape coated on both sides with rubber-base pressure-sensitive adhesive.

—10

Fig. 2

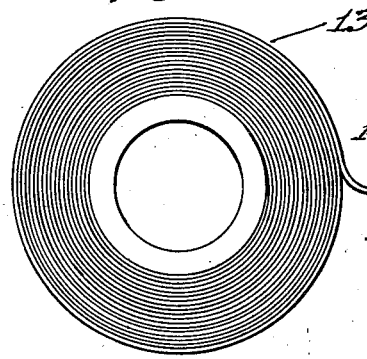

—13
—14

Permanent backing having back surface coating of low adherency to adhesive (functions as a liner in the roll)

—15

Rubber-base pressure-sensitive adhesive coating.

Inventors
Waldo Kellgren
Warren D. Hurd
By Carpenter, Abbott, Coulter & Kinney
Attorneys Patented Feb. 26, 1946

2,395,668

UNITED STATES PATENT OFFICE 2,395,668

LINER FOR ADHERENT RUBBER SURFACES AND THE LIKE

Waldo Kellgren and Warren D. Hurd, St. Paul, Minn., assignors to Minnesota Mining & Manufacturing Company, St. Paul, Minn., a corporation of Delaware Application November 3, 1941, Serial No. 417,744

7 Claims. (Cl. 206—59)

This invention aims to provide an improved liner for adhesive tapes and for adherent rubber surfaces generally.

Milled rubber, and rubber compounded with tack-producing materials (such as resins or softeners), has an adherent surface which causes sheets or coatings thereof to adhere or cohere when brought together. It is often desired to roll or stack such sheets, or sheet material having similar rubber coatings, and where this would result in a sticking or bonding together of rubber surfaces thus brought into mutual contact, a liner may be employed as a temporary protective covering, serving to separate the surfaces.

Adhesive tapes of the pressure-sensitive (tacky) type often require such a liner. Thus bandages and corn plasters, comprised of a strip of adhesive tape having uncovered surface portions, may employ a liner to cover the exposed adhesive. This serves not only to prevent such articles from sticking together but to facilitate handling and to protect against dirtying and contamination.

Pressure-sensitive adhesive tapes of the double-coated type are employed for many purposes. These tapes have a backing which is coated on both sides with adhesive. A removable liner must be used in order that such adhesive tape may be wound into rolls, as otherwise the adjacent turns would bond together and unwinding would be made difficult or impossible (see, for example, the tape described in the patent to Kellgren, No. 2,206,899, issued July 9, 1940).

Even in the case of adhesive tape of the ordinary kind, it is desirable when such tape is wound upon itself in roll form, that the back surface of the backing adhere to a limited degree to the contacting adhesive surface in order to facilitate ready unwinding. In such a roll, the backing functions not only as a permanent base for the adhesive coating but also as a temporary liner since, in the latter connection, the backing in each turn of the roll temporarily covers the adhesive surface of the overlying turn.

In accordance with this invention the liner bears a coating (which may or may not also penetrate through or impregnate the body of the liner) of a composition which we have found to be remarkably effective in accomplishing the desired results. This composition greatly reduces the adherence of tacky rubber surfaces, thereby facilitating removal.

The accompanying drawing illustrates the invention as embodied in rolls of pressure-sensitive adhesive tape which are shown in diagrammatic side views.

Fig. 1 shows a tape roll 10 formed of an adhesive tape 11 which is coated on both sides with a rubber-base pressure-sensitive adhesive, and laminated to a removable liner 12 of creped paper coated on both sides with a composition which has a low adherency to the pressure-sensitive adhesive. The liner is thus interwound with the adhesive tape, and the latter is located in the roll between turns of the liner which prevents adjacent turns of the adhesive tape from bonding together. The tape and liner are wound in so that the liner is on the outside. When drawn from the roll, the liner can be readily separated from the tacky tape due to the low adherency; and unwinding is likewise facilitated by the low adherency.

Fig. 2 shows a roll 13 of pressure-sensitive adhesive tape wound directly upon itself. The adhesive tape has a permanent backing 14 having a back surface coating of low adherency to the pressure-sensitive adhesive, and is coated on the inside with a rubber-base pressure-sensitive adhesive coating 15. The backing may, for example, be a creped paper which is coated on the back with the composition of low adherency. The backing serves the dual use of a base for the tacky adhesive and a liner for facilitating unwinding of the tape from the roll.

The liner surface is preferably rugose or uneven, rather than flat and smooth, in order to present a limited area of contact, thereby further reducing the adhesion and facilitating removal. Creped paper has been found quite useful. An open mesh cloth, such as crinoline, also serves to provide such a surface. Such a surface, sized or coated with the composition of this invention, not only permits of ready removal of the liner from tacky rubber surfaces, but the liner may remain in contact with pressure-sensitive rubber base adhesive surfaces for long periods without adversely affecting the adhesive or its adhesive power. This latter desirable property is of particular importance in the case of liners employed in rolls of pressure-sensitive adhesive tape. Such tape is frequently not used until some months after it is made and it is important that its adhesive properties remain substantially the same. Furthermore, the coating on the liner remains substantially unaffected and does not pull off when the tape is removed from the liner, and the liner can be repeatedly reused if desired.

Another important feature is that the effectiveness of the liner and its desirable characteristics are not lost when subjected to the extremes of cold and hot weather, and high and low humidities, which are often encountered in various parts of the country. For example, rolls of tape may be subjected to temperatures well over 100° F. for considerable periods while being stored in warehouses.

The liner composition which we have discovered to be so satisfactory is essentially comprised of medium-ethoxy ethyl cellulose and lesser proportions of hydrogenated castor oil wax and higher fatty acid, combined in a fused homogeneous non-bleeding blend. This may be conveniently applied to the liner in solution form followed by heating to drive off the solvent and sufficient to produce a continuous film.

The medium-ethoxy ethyl cellulose may have an ethoxy range of approximately 43–47%. The ethyl cellulose may be obtained in a wide range of viscosities, such as 7–300 centipoises (rated on the basis of the viscosity of a 5% by weight solution in 60:40 toluene-ethanol at 25° C.). The lower viscosities facilitate coating and permit of a higher solids content when paper is impregnated.

The hydrogenated castor oil wax is exemplified by Opal wax No. 10, having a melting point of about 180° F., sold by E. I. du Pont de Nemours & Co., Inc.

The higher fatty acid is exemplified by stearic acid, oleic acid and lauric acid.

*Example*

|   | Parts by weight |
|---|---|
| Medium-ethoxy ethyl cellulose | 132 |
| Hydrogenated castor oil wax | 66 |
| Stearic acid (triple press) | 33 |
| Hydrosolvent No. 2 | 490 |
| Butyl alcohol | 260 |

An illustrative ethyl cellulose is one having an ethoxy content of 45–46½% and a viscosity of 20 centipoises. The Hydrosolvent No. 2 is a volatile petroleum solvent of the aromatic type, containing about 70% toluol.

The components may be conveniently combined in an internal mixer of the type well known in the rubber industry (such as a Baker Perkins Mogul mixer), which is provided with a steam jacket for heating.

The mixer is heated up with 80# steam in the jacket and the stearic acid and wax are dumped in, followed by mixing until they are completely melted together. The ethyl cellulose is then slowly added and mixing is continued for about four hours or until the fused mass is homogeneous. The steam is turned off and the Hydrosolvent is slowly incorporated, followed by addition of the butyl alcohol, with continued mixing for about half an hour. The solution may then be drawn off and is ready for use.

A liner which has been found quite useful in making up rolls of double-coated pressure-sensitive adhesive tape may be made as follows: A web of 35# per ream bibulous kraft crepe paper is impregnated with the foregoing solution in amount which will leave about 6–7 grains of impregnant solids per 24 sq. in., the temperature of the saturating solution being about 135–140° F., and is then passed through a tunnel dryer where the temperature to which it is subjected increases from about 180° F. to about 210° F. The rate of travel is adjusted so that the solvents are removed and a continuous film of the impregnant is formed on the surfaces. This hot drying direct from a true solution results in a continuous film even though the temperature used is below the fusion temperature of the dried product. If the initial drying were at such a low temperature as to form a gel, it would then be necessary to heat the impregnated paper to about 250° F. in order to form a film by fusion. In either case, the film may be designated as "fused"; the necessary temperature required for obtaining it depending upon the technique.

In this case the liner has been coated on both sides, since both sides are contacted by pressure-sensitive adhesive when it is wound into a roll of double-coated adhesive tape. The impregnant composition also serves to unify and strengthen the paper.

Where only one side of the liner is to be used for covering an adherent rubber surface, the solution may be applied to that side without necessarily saturating or penetrating the entire thickness. Where the paper is to serve as a backing for adhesive tape, the adhesive may be coated upon the reverse side, the treated paper then playing the dual role of a base for the adhesive and a liner for facilitating unwinding of the tape from a roll thereof.

The liner is not limited to use in connection with adherent rubber surfaces wherein natural rubber is employed, as it has been found effective for use where the tacky layer or adhesive is comprised of a rubber substitute or synthetic rubber, such as, for example, where the tacky adhesive is a blend of rubbery isobutylene elastomer and rosin.

To illustrate the effectiveness of the liner in reducing the force required for stripping adhesive tape therefrom, the following experimental data is cited. A comparison is made with paper sized with shellac and with Holland cloth (which is widely used as a liner), and the force required to strip the adhesive tape from a glass surface is also given to provide a standard of comparison. The paper treatment with the ethyl cellulose composition was in accordance with the preceding example, but in addition to using creped paper a further sample was made using a flat-stock kraft paper to facilitate comparison of the specific adhesion with that for Holland cloth and glass, since the latter of course present flat surfaces. The same types of creped and flat paper were also coated with shellac to provide samples having a rugose surface in one case and a flat surface in the other case, for comparison purposes.

The tape used for the tests was a regular pressure-sensitive masking tape having a rubber-resin adhesive of an aggressively tacky nature. One inch width strips of the adhesive tape were pressed in firm contact with the various test liner surfaces, using a steel roller to secure uniform results. The test lots were allowed to stand for twenty-four hours under room conditions (in this case 78–81° F. and 50% relative humidity) and the stripping forces measured. The glass stripping force was measured after one half hour of contact since it does not change.

The stripping force was measured by placing the sample with its back secured to a driven platform which can be moved at a constant rate through a worm drive coupled to an electric motor. The end of the adhesive tape was peeled back and connected to a device for measuring tension, such that the tape was pulled back at a 180° angle when the platform was driven. In making the test, the platform was driven at the constant rate of 6 feet per minute, causing the tape to be stripped from the liner surface with the removal force being indicated by the tension, measured in ounces. The following results were obtained:

| | Stripping force |
|---|---|
| 1. Crepe paper coated per example | 6 |
| 2. Flat paper coated per example | 11 |
| 3. Crepe paper coated with shellac | 20 |
| 4. Flat paper coated with shellac | 26 |
| 5. Holland cloth | 28 |
| 6. Glass | 33 |

These values are substantially the same as those obtained in other tests where measurements were made at the end of a one-half hour contact period.

In another test which shows that the present liner does not kill the tack of adhesive tape to which it is applied, a creped paper liner treated in accordance with the example had strips of ⅝-inch width pressure-sensitive adhesive tape rolled in contact with its surface and was placed in an oven for 15 days at 120° F. and 100% relative humidity. It was then removed from the oven and the tape stripped off by hand. The tape was allowed to dry out for two hours at room temperature (80° F.) and its adhesion value was then determined by stripping from a glass plate, using the adhesion tester previously described. This was compared with the adhesion value of a fresh sample of the same kind of tape in order to determine whether the contact of the adhesive with the liner had harmed the adhesiveness. It was found that the removal force for the fresh tape was 22 ounces, while that for the tape which had contacted the liner was 20 ounces, which is substantial agreement within the limit of measurement error; showing that the liner had not appreciably harmed the adhesive.

The value of the present liner has also been thoroughly demonstrated under the conditions of actual commercial use.

What we claim is as follows:

1. For use as a temporary covering for adherent rubber surfaces, a liner having a surface coated with a fused and homogeneous non-bleeding blend comprised of medium-ethoxy ethyl cellulose and lesser proportions of hydrogenated castor oil wax and higher fatty acid.

2. For use as a temporary covering for adherent rubber surfaces, a creped paper having a surface coating comprised of medium-ethoxy ethyl cellulose and lesser proportions of hydrogenated castor oil wax and higher fatty acid forming a fused and homogeneous non-bleeding film blend.

3. A liner comprising a creped paper coated and impregnated with a fused and homogeneous non-bleeding blend of medium-ethoxy ethyl cellulose combined with lesser proportions of hydrogenated castor oil wax and higher fatty acid.

4. In a roll of double-coated pressure-sensitive adhesive tape, an interwound liner of creped paper impregnated and coated on both sides with a fused and homogeneous non-bleeding composition comprised of medium-ethoxy ethyl cellulose and lesser proportions of hydrogenated castor oil wax and higher fatty acid.

5. A liner having a rugose surface coated with a fused and homogeneous non-bleeding blend comprised of medium-ethoxy ethyl cellulose and lesser proportions of hydrogenated castor oil wax and higher fatty acid.

6. A liner according to claim 5 wherein the proportions of the ethyl cellulose, hydrogenated castor oil wax and higher fatty acid are in the ratio of approximately 4 to 2 to 1, respectively.

7. In a roll of pressure-sensitive adhesive tape which is tacky on both sides, an interwound liner of creped paper filmed on both sides with a fused and homogeneous non-bleeding composition essentially comprised of medium-ethoxy ethyl cellulose, hydrogenated castor oil wax and higher fatty acid, in the ratio of approximately 4 to 2 to 1, respectively.

WALDO KELLGREN.
WARREN D. HURD.